(12) United States Patent
Yeddanapudi et al.

(10) Patent No.: US 9,331,943 B2
(45) Date of Patent: May 3, 2016

(54) ASYNCHRONOUS SCHEDULING INFORMED BY JOB CHARACTERISTICS AND ANTICIPATORY PROVISIONING OF DATA FOR REAL-TIME, PARALLEL PROCESSING

(71) Applicant: Robin Systems, Inc., Milpitas, CA (US)

(72) Inventors: Krishna Satyasai Yeddanapudi, Pleasanton, CA (US); Christopher Alan Mildebrandt, San Jose, CA (US); Rao V. Madduri, Benicia, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 29 days.

(21) Appl. No.: 14/174,473

(22) Filed: Feb. 6, 2014

(65) Prior Publication Data

US 2015/0074672 A1  Mar. 12, 2015

Related U.S. Application Data

(60) Provisional application No. 61/876,045, filed on Sep. 10, 2013.

(51) Int. Cl.
| | |
|---|---|
| G06F 9/50 | (2006.01) |
| H04L 12/801 | (2013.01) |
| G06F 9/455 | (2006.01) |
| G06F 9/54 | (2006.01) |
| H04L 12/851 | (2013.01) |
| G06F 11/34 | (2006.01) |

(52) U.S. Cl.
CPC .............. *H04L 47/11* (2013.01); *G06F 9/455* (2013.01); *G06F 9/5038* (2013.01); *G06F 9/544* (2013.01); *G06F 9/546* (2013.01); *G06F 11/34* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 2002/0002578 A1* | 1/2002 | Yamashita | 709/105 |
| 2003/0018691 A1* | 1/2003 | Bono | G06F 9/4881 718/106 |
| 2003/0191795 A1* | 10/2003 | Bernardin et al. | 709/105 |
| 2010/0087941 A1* | 4/2010 | Assaf | G06Q 10/06 700/101 |
| 2010/0223618 A1* | 9/2010 | Fu et al. | 718/102 |
| 2011/0185305 A1* | 7/2011 | Lai et al. | 715/772 |
| 2012/0096468 A1* | 4/2012 | Chakravorty et al. | 718/103 |
| 2013/0058412 A1* | 3/2013 | Chen | H04N 19/436 375/240.13 |
| 2014/0137122 A1* | 5/2014 | Egolf et al. | 718/102 |

\* cited by examiner

*Primary Examiner* — Tuan Dao
(74) *Attorney, Agent, or Firm* — David R. Stevens; Stevens Law Group

(57) ABSTRACT

Systems and methods are disclosed for scheduling jobs processed in a distributed fashion to realize unharnessed efficiencies latent in the characteristics of the jobs and distributed processing technologies. A job store may be communicatively coupled to a job analyzer. The job analyzer may be operable to read information characterizing a job to identify multiple data blocks to be processed during the job at multiple locations in a cluster of nodes. A scheduling module may use information about the multiple data blocks, their storage locations, their status with respect to being provisioned to processing logic, data blocks to be processed by other jobs, data blocks in cache that have been pre-fetched for a prior job, quality-of-services parameters, and/or job characteristics, such as job size, to schedule the job in relation to other jobs.

18 Claims, 9 Drawing Sheets

ASYNCHRONOUS SCHEDULING INFORMED BY JOB CHARACTERISTICS AND ANTICIPATORY PROVISIONING OF DATA FOR REAL-TIME, PARALLEL PROCESSING

RELATED APPLICATIONS

This application claims the benefit of and hereby incorporates by reference U.S. Provisional Application Ser. No. 61/876,045, entitled Virtual Hadoop Clusters and filed on Sep. 10, 2013.

FIELD OF THE INVENTION

This invention relates to the scheduling of data-processing jobs and more particularly to the scheduling of data-processing jobs run on multiple nodes of a cluster of nodes coupled with distributed and/or partitioned file systems.

BACKGROUND OF THE INVENTION

The ability to process large amounts of data within shorter periods of time is growing in importance. For one thing, more and more data is being produced as more mobile technologies with larger information-sensing capacities are spreading, more people interact over the internet via social media, and more devices become equipped with smart technologies, among other reasons. Some of such sources include web searches, email, logs, internet marketing, geospatial data, financial data, space research, healthcare data, scientific research, and more. Furthermore, the world's ability to store data is increasing, according to one study, for example, the world's per-capita data storage capacity has been doubling every 40 months since the 1980s.

Not only are larger and larger data sets becoming more common, but the processing of such data sets is becoming increasingly important in more areas. Large data sets are frequently involved in several areas of research from meteorology, to genetics, to many other fields of research requiring complex modeling. The ability to process large amounts of data has also become important in more every-day applications from finance, marketing, e-commerce, social media, and internet searches.

To make possible the processing of large data sets, often the presence of multiple chunks that can be processed independently is leveraged to break up the job for parallel processing. Parallel processing can occur on several nodes, or machines, simultaneously, greatly speeding up the underlying job. However, sending large amounts of data across a network for processing can introduce its own complexities, take time, and occupy large amounts of bandwidth within a network. Many other complex problems arise in distributed processing generally, such as the details of the parallel and distributed processing itself and the handling of errors during processing.

In the late 1990s and early 2000s, in the process of addressing problems associated with indexing the massive amounts of information that its search engine relies on, Google noticed several features common to many big-data processing problems. As a result, it developed a distributed file system, the Google File System (GFS), that provides a framework for breaking-up and storing large data sets and lends itself to the processing of those large data sets. Additionally, Google developed a framework, known as the MapReduce framework, for processing distributed data sets implemented in two main phases. These main phases comprise a map phase that takes input files with key value pairs and produces intermediate files with new key value pairs and a reduce phase that combines values from common keys in the intermediate files.

Collaboration between large corporations and other contributors has led to open source versions of the GFS and MapReduce framework based on papers published by Google in 2003 and 2004. The open source versions are referred to as the Hadoop Distributed File System (HDFS) and Hadoop MapReduce engine, or collectively as simply Hadoop. Whether in terms of Google's version, Hadoop, or some other version, these distributed file systems and MapReduce frameworks have proved a boon to big data processing, in such areas as search, analytical functions, transformations, aggregations, data mining, among others, and have become ubiquitous in the field. However, additional demands, such as those of larger data sets and needs for quicker processing times, require additional innovations that can sit atop Hadoop-like approaches and potentially other approaches to distributed processing.

Furthermore, multiple big-data jobs are often provisioned to a common implementation of a big-data processing technology, such as, but not limited to, a Hadoop-like approach. However, not all big-data jobs have the same requirements and priorities. These differing requirements and priorities have implications for the efficiencies with which the corresponding jobs can be processed, implications arising from the abilities and limitations of the underlying technology used to process the jobs. Recouping efficiencies in light of these implications also requires additional innovations.

The following description and claims set forth innovations in the context of the foregoing discussion.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

Figure 1:
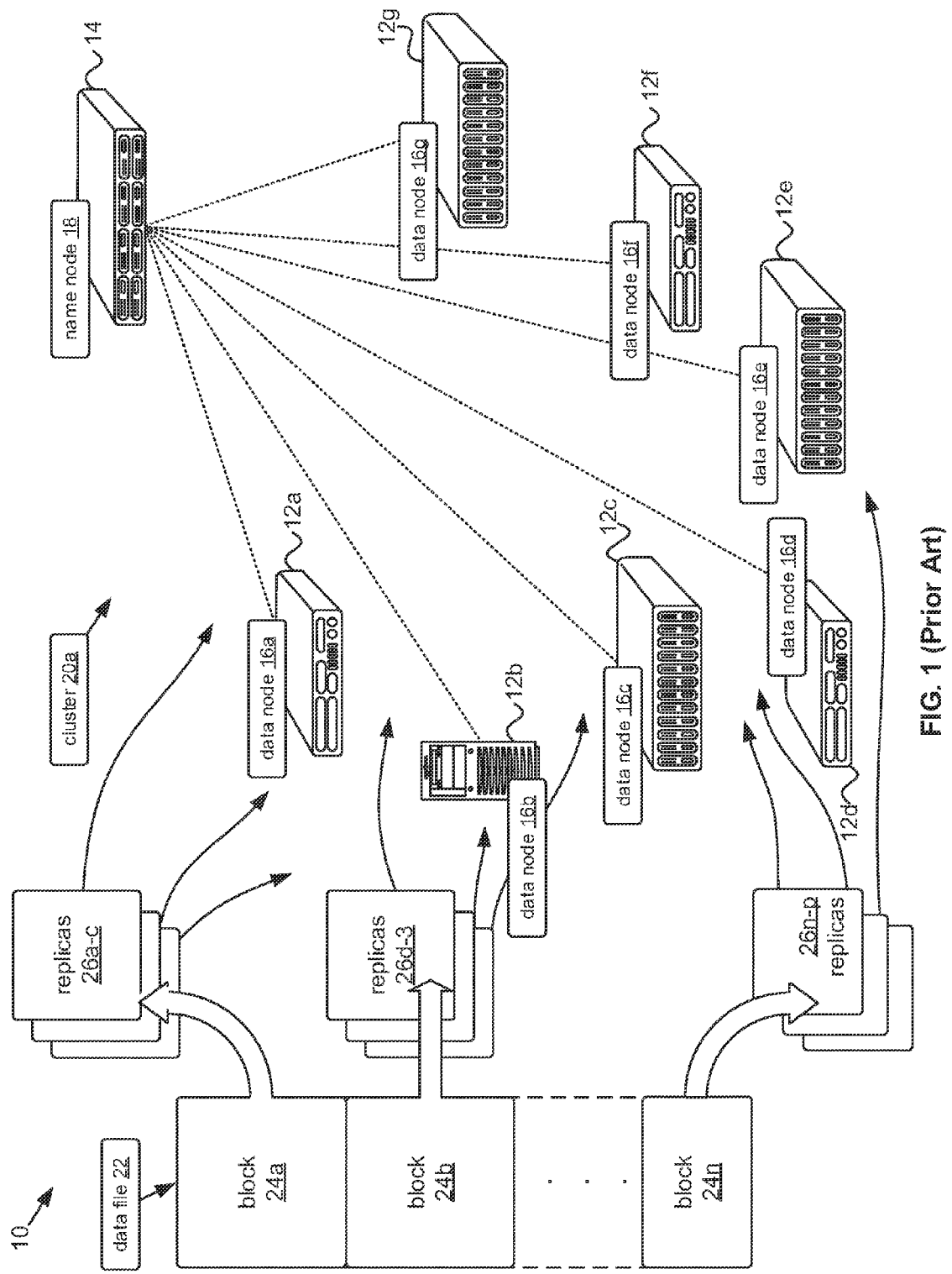
FIG. 1 is a schematic block diagram of a distributed filing system in accordance with prior art.

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Although distributing processing duties for large jobs across several nodes can make the running of such jobs possible and/or practical, getting the data to those nodes can introduce complexities and slow down the jobs. Hadoop and Hadoop-like approaches (hereinafter "Hadoop approaches") provide a framework that reduces these complexities by transparently and intelligently handling the storage and processing of large data sets in a way that, in a sense, takes the processors to the data, as opposed to taking the data to the processors. However, the very strength of these approaches in reducing data handling obscures additional approaches where improvements can be made in terms of the details of the way data is handled.

Hadoop approaches are designed to place processors in close proximity to the data blocks which they process, which likely reside on or near those nodes. However, such data blocks still need to be loaded into caches at those nodes and/or provisioned to processing logic. Furthermore, although the distances are usually reduced by Hadoop approaches, some data blocks may need to be transferred to the nodes where they are processed. In some instances, which extend the capabilities of Hadoop approaches, data blocks may even reside outside the cluster where they are processed, for example in the cloud. Typical data block sizes involved in Hadoop approaches are 128 Mega Bytes (MBs) and above, indicative of the delays that warm-up activities like loading caches and transferring data blocks can produce.

Additionally, jobs with varying characteristics, some of which may share overlapping data, may be provisioned by clients to a single job store for parallel processing on a common cluster of nodes. The nodes may then process these jobs without adequate concern for different requests and requirements associated with these jobs. They may also process the jobs without leveraging overlapping data and without taking into account data provisioning times required by the technologies employed at these nodes.

The present application discloses innovations to address the different requests and requirements of different jobs and to reduce latencies currently involved in processing those jobs. For example, a system for scheduling a job may comprise a job store operable to receive jobs. A job analyzer may be communicatively coupled to the job store that may be operable to identify multiple data blocks to be processed by a job in the job store from characterization information for the job. The multiple data blocks may be stored at multiple storage locations within a network. A scheduling module may be operable to schedule the processing of the job to promote availability of the multiple data blocks at multiple instances of processing logic within the network once processing of the job commences.

In some examples, a control manager may be communicatively coupled to the network and may be operable to provision the multiple data blocks of a given job to the multiple instances of processing logic from the multiple storage locations in the network. In such examples, the scheduling module may be further operable to schedule a processing time for the job after a provisioning-completion threshold has been reached during the process of provisioning the multiple data blocks. Additionally, in certain examples, the control manager may be further operable to provision the multiple data blocks of the job to the multiple instances of processing logic while a prior job is being processed and/or having the control manager provision a set of data blocks to be processed during the prior job.

To further coordinate the scheduling of jobs with the availability of data at processing logic, some examples may also include a data-locating module that may be communicatively coupled to the network. The data-locating module may be operable to locate the multiple storage locations of the multiple data blocks and assign an estimated provisioning time for the multiple data blocks to be provisioned to processing logic from those storage locations. In such examples, the scheduling module may be further operable to schedule a given job with a processing order relative to another job from the job store.

The processing order may place the given job behind the other job where the estimated provisioning time is greater than a maximum time and/or greater than a second estimated provisioning time for the other job. Conversely, the processing order may place the given job before the other job where the estimated provisioning time is less than a minimum time and/or less than the second estimated provisioning time for the other job. In a subset of such examples, the data-locating module may assign the estimated provisioning time such that the estimated provisioning time is greater than the maximum time and/or the second estimated provisioning time where at least one of the multiple storage locations is located outside a cluster of nodes coordinated to process the job in parallel.

To leverage data overlap between jobs for efficiency gains, some examples may include a data-overlap module communicatively coupled to the job store and/or the job analyzer. The data-overlap module may be operable to determine an original degree of overlap between the multiple data blocks of a given job and a set of data blocks subject to a comparison job. In such examples, the scheduling module may be further operable to schedule the job to prevent a potentially-intervening job from being scheduled between the job and the comparison job. The scheduling module may take these preventative measures where the potentially-intervening job has a lesser degree of overlap, with respect to the job and the comparison job, than the original degree of overlap.

To address the differing requirements of different jobs in the job store, some examples may include a quality-of-service module communicatively coupled to the scheduling module. The quality-of-service module may be operable to read a quality-of-service parameter from the characterization information of a given job. In such examples, the scheduling module may further be operable to schedule the given job before another job in the job store, where the other job has a second quality-of-service parameter with a lower priority. The scheduling module may also be operable to so position the given job where the quality-of-service parameter satisfies a predetermined requirement to receive its advanced position.

Figure 2:
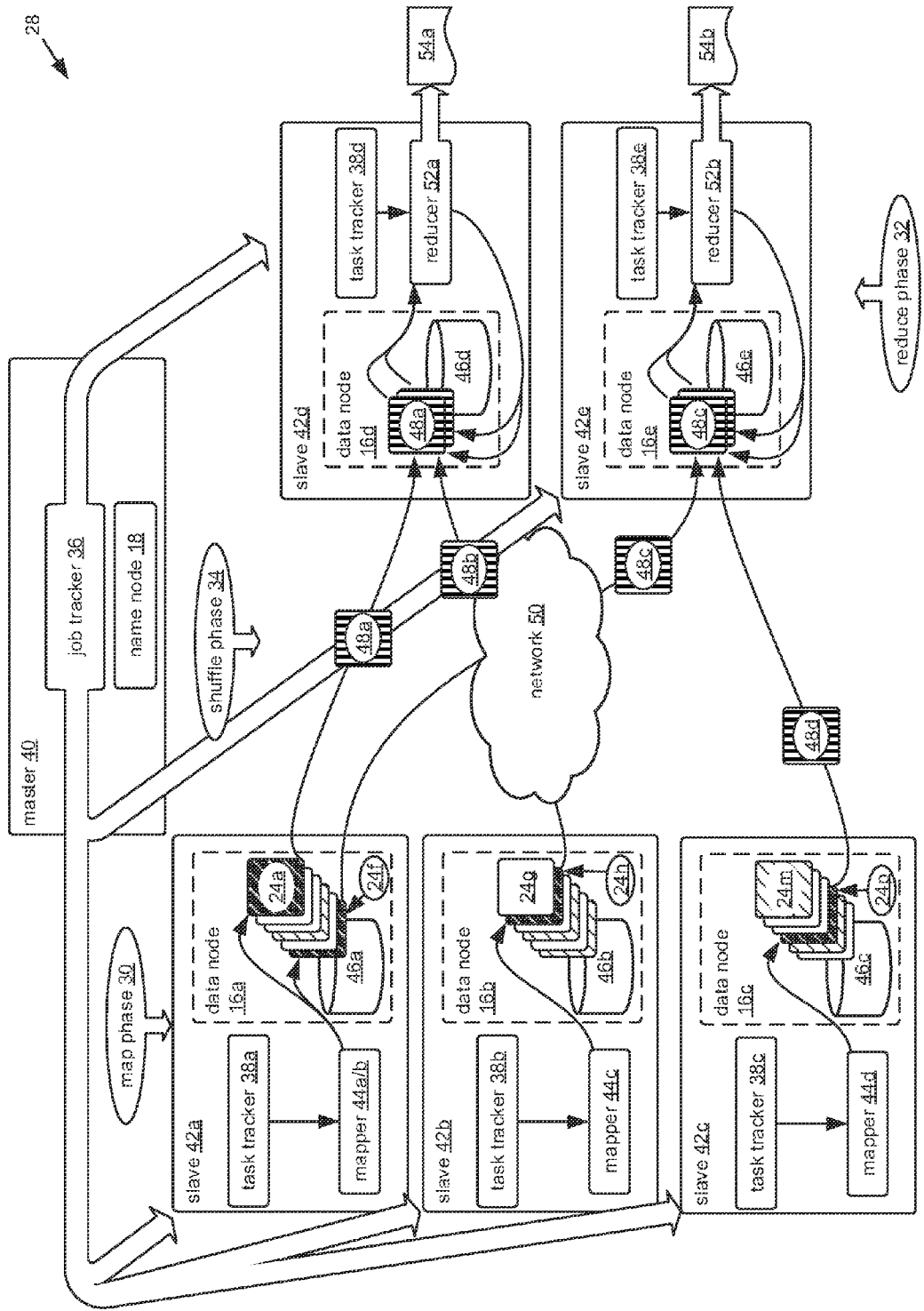
FIG. 2 is a schematic block diagram of a MapReduce framework/engine in accordance with prior art.

To provide a more thorough account of embodiments of the present innovations, and to discuss examples not treated above, it is helpful to provide some additional contextual information about approaches to processing large data sets, such as Hadoop approaches. Therefore, FIGS. 1 and 2 are provided that explain two concepts involved in Hadoop approaches. These two concepts are automated, distributed filing systems, like GFS and HDFS, and the MapReduce framework/engine.

Referring to FIG. 1, an Automated, Distributed Filing System (ADFS) 10 is depicted, consistent with examples such as GFS or HDFS, as applied in Hadoop approaches. The ADFS 10 may be implemented in software and/or firmware and/or the like residing at various hardware components 12a-12g, 14 with the use of modules, as discussed below. The hardware components 12a-12g, 14 may comprise commodity hardware and/or specially purposed hardware. The various hardware components 12a-12g, 14 may provide the infrastructure for various data nodes 16a-16g and a name node 18, to be discussed in greater detail below, which comprise a cluster 20a.

The ADFS 10 may be configured to receive a large data file, or data set, 22 and split the large data set 22 into multiple blocks 24a-24n (also referred to as data blocks) for storage on multiple data nodes 16, thereby increasing the storage capacity of the ADFS 10. In some examples, the data set 22 may include multiple files that share a logical grouping. The blocks 16 may be fairly large in size, for example, from tens of megabytes to gigabytes. To provide redundancy, in case a data node 16 on which a given block 24 is stored fails and/or to provide greater access to the blocks 24, the blocks 24 may be replicated to produce a number of replicas 26a-c, 26d-f, 26n-p of each block 24a, 24b, 24n. As used in this application, the term block 24 is synonymous with any replica 26 carrying the same data and the term data block 24/26. Although the example depicted in FIG. 1 depicts three replicas 26 for each block 24, as can be appreciated, any number of ratios of replicas 26 to primary blocks 24 may be used. These replicas 26 may then be stored at the various data nodes 16, which may store one or more blocks 24 and/or replicas 26.

The ADFS 10 may be configured for fault tolerance protocols to detect faults and apply one or more recovery routines. To assist in fault tolerance, the data nodes 16 and the name node 18 may be configured with a web server. Also, the ADFS 10 may be configured to store blocks/replicas 24/26 as close to processing logic on the hardware components 12a-12g, 14 as possible so that a job can be run on the blocks 24 pertaining to the data set 22 with minimal block transfers. Also, multiple different data sets 22 may be stored on the cluster 18 in this way.

The name node 18 may fill a role as a master server in a master/slave architecture with data nodes 16a-g filling slave roles. Since the name node 18 may manage the namespace for the ADFS 10, the name node 18 my provide awareness, or location information, of the various locations at which the various blocks/replicas 24/26 are stored. For example, the name node 18 may maintain a directory tree of all the blocks/replicas 24/26 in ADFS 10 and may track where the various blocks/replicas 24/26 are stored across the cluster 20a. Furthermore, the name node 18 may determine the mapping of blocks/replicas 24/26 to data nodes 16. Under the direction of the name node 18, the data nodes 16 may perform block creation, deletion, and replica functions.

Although only seven data nodes 16a-g are depicted in FIG. 1 for purposes of illustration, as can be appreciated, any number of nodes 16, including numbers in the thousands, are possible. As described with respect to FIG. 1, an ADFS 10 may provide automation and infrastructure for placing a large data set 22 on several data nodes 16 as blocks/replicas 24/26, spread out on physically different machines/nodes 12,14,16, 40,42 and even across data centers, in effect, taking the processing logic close to the data. In the process, the ADFS 10 may set the stage for various approaches to distributed and/or parallel processing. For example, as discussed below, the locational awareness of the ADFS 10, may be leveraged to provide more efficient approaches to distributed and/or parallel processing. FIG. 2 is used to provide context relevant to the innovations explained herein of one such approach.

Referring to FIG. 2, elements of a typical MapReduce engine/framework 28 are depicted. A MapReduce engine 28 may implement a map phase 30 and a reduce phase 32, described in further detail below. A MapReduce engine 28 may comprise additional phases, such as a combination phase and/or a shuffle phase 34, also described below, between the map phase 30 and the reduce phase 32.

A master/slave architecture, as discussed with respect to the ADFS 10 in terms of the relationship between the name node 18 and the data nodes 16, may be extended to the MapReduce engine 28 in terms of a job tracker 36, which also may be implemented as a resource manager and/or application master, in a master role and one or more task trackers 38a-e, which also may be implemented as node managers, in a slave role. Together, the job tracker 36 and the name node 18 may comprise a master node 40, and individual parings of task trackers 38a-e and data nodes 16a-e may comprise individual slave nodes 42a-e. In some examples, the master node 40 may also be configured with its own data node 16 and task tracker 38.

Consistent with the concept of distributed, parallel processing, a job may involve multiple component tasks. The job tracker 36 may schedule and monitor the component tasks, coordinating the re-execution of a task where there is a failure. The job tracker 36 may be operable to harness the locational awareness provided by the name node 18 to determine the nodes 42/40 on which various data blocks/replicas 24/26 pertaining to a job reside and which nodes 42/40 and/or machines/hardware and/or processing logic 12 are nearby.

The job tracker 36 may further leverage such locational awareness to optimize the scheduling of component tasks on available slave nodes 42 to keep the component tasks as close to the underlying data blocks/replicas 24/26 as possible. In the event that the requisite processing logic on a node 42 on which a relevant block/replica 24/26 resides is unavailable, the job tracker 36 may select a node 42 on which another replica 26 resides, or select a node 42 in the same rack, or otherwise geographically proximate, to which to transfer the relevant block/replica 24/26, reducing the load on a network backbone. Owing to its monitoring and rescheduling capabilities, the job tracker 36 may reschedule a component task that fails.

The component tasks scheduled by the job tracker 36 may involve multiple map tasks and reduce tasks to be carried out on various slave nodes 42 in the cluster 20a. Individual map and reduce tasks may be overseen at the various slave nodes 42 by individual instances of task trackers 38 residing at those nodes 42. Such task trackers 38 may spawn separate Java Virtual Machines (JVM) to run their respective tasks and/or may provide status updates to the job tracker 36, for example and without limitation, via a heartbeat approach. Although FIG. 2 only depicts five such nodes 42a-3e for purposes of illustration. However, any number of nodes may be involved, easily including numbers in the thousands.

During a map phase 30, a first set of slave nodes 42a-c may be utilized and/or dedicated for map tasks. For example, a job may involve processing the various blocks/replicas 24/26 that make up a data set 22. Although the tasks may be run in parallel, the processing of each block/replica 24/26 at the various slave nodes 42a-c makes up an individual map task. To execute a map task, a task tracker 36 may apply a mapper 44 to a block/replica 24/26 pertaining to a job being run.

For example, the job tracker 36 may assign a first task tracker 38a to apply a first mapper 44a to a first data block 24a pertaining to a job being run by the job tracker 36. In some examples, the job tracker 36 may provide the first mapper 44a to the first task tracker 38a. In other examples, the first mapper 44a, or a portion thereof, may already reside at the slave node 42a at which the task tracker 38a also resides. The first data block 24a may reside at a first data node 16a that also stores several other blocks/replicas 24/26. The first task tracker 38a may select the appropriate data block 24a from among the other blocks/replicas 24/26 in a storage volume 46a used to maintain the first data node 16a at the first slave node 42a. A storage volume 46 may comprise a disk on hardware 12 supporting a slave node 42, a Solid-State Drive (SSD), or any other technology for storing data.

Data blocks 24a, 24f, 24h, 24p corresponding to a given job being run by the job tracker 36 in FIG. 2 are depicted with boxes having white, diagonal stripes on a black background, similar to the one labeled 16a. As can be appreciated, these blocks 24a, 24f, 24h, 24p may be stored in various locations relative to other blocks/replicas 24/26 pertaining to other jobs and/or data sets 22, indicated by alternative shading patterns. Also, as depicted with respect to the first data node 16a, a single data node 16 may store multiple blocks/replicas 24/26 pertaining to a given job.

A mapper 44 may be executable to treat an input data block/replica 24/26 as a set of key-value pairs. A mapper 44 may proceed to process the block/replica 24/26 by producing a set of intermediate key-value pairs written in an intermediate record 48. An illustrative, but non-limiting example, may be provided in the context of search engines and something like the page-rank algorithm with respect to which, at least in part, MapReduce engines 28 were first developed. In such a context, a web crawler may collect a large data set 22 that stores web pages searched and links between them. In such an example, an RDFS 10, such as GFS, may split this data set 22 into many blocks/replicas 24/26, each of which may become an input for a mapper 44.

A mapper 44, in such an example, may view the input block/replica 24/26 as a set of key-value pairs, where a key may correspond to a source page and a value may correspond to a target page to which a link on the source page points. The mapper 44 may run as a function applied to each key-value pair, in the process counting the number of pages that link to a given target page. In such an example, the target page, which corresponds to the value parameter of the input, may become the key parameter in a new key-value pair produced by the mapper 44 and recorded in an intermediate record 48. In such example, the value parameter of the new key-value pair, may be the number of links to the target page from various source pages. An intermediate record 48 may, therefore, be a set on new key-value pairs generated by applying a map function to a set of key-value pairs in the input block/replica 24/26. In the example, an intermediate record 48 would correspond to a set of new key-value pairs comprising a set of target pages paired with counts of links to those target pages.

However, after a map phase 30, the results for a job may be scattered across several different intermediate records 48a-d. The reduce phase 32 may be applied to bring these scattered results together. A shuffle phase 34 may be implemented to facilitate the reduce phase 32. During the shuffle phase 34, the intermediate records 48 may be shuffled so that intermediate records with common keys, e.g. 48a, 48b and 48c, 48d, may be directed across a network 50, which may connect various nodes 40, 42 in a cluster 20a, to nodes 42d, 42e with the same reducers 52, e.g., 52a and 52b respectively.

The job tracker 36 may schedule a reducer phase 32 to task trackers 38d-e on slave nodes 42d-e within a cluster 20a. Data nodes 16d-e at those slave nodes 42d-e may receive intermediate records 48a-d over a network 50 for storage in corresponding storage volumes 46d-e. Individual task trackers 38d-e may apply a reducer 52a/52bb to the intermediate records 48a-b/48c-d stored by the data node 16d/16e at the corresponding slave node 42d/42e. In some examples, the job tracker 36 may provide a reducer 52a to a first task tracker 38d. In other examples, the reducer 52a, or a portion thereof, may already reside at the slave node 42d at which the task tracker 38d also resides.

A reducer 52 may run on multiple intermediate records 48 to produce an output record 54. An output record 54 generated by such a reducer 52 may group values associated with common keys to produce combined values. Picking up with the previous example, the counts for links to the various target pages in the various intermediate records 48 could, for example, be summed. In such a way, one or more reduce phases 32 may be used to combine the results from several different mappers 44 in different intermediate files 48 to create a result for a job. Due to the way in which individual mappers 44 and/or reducers 52 operate at individual nodes 42/40, the term 'mapper' and/or 'reducer' may be used to refer to the nodes 42 at which individual instances of mappers 44 and/or reducers 52 are implemented.

The functions involved in implementing such an ADFS 10, some other distributed filing system, a Hadoop engine 28, some other approach for processing distributed data, and/or the innovations discussed herein may be handled by one or more subsets of modules. With respect to the modules discussed herein, aspects of the present invention may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of a module, and possibly all of the module, that are implemented with software may be executed on a micro-processor, Central Processing Unit (CPU) and/or the like. Any hardware aspects of the module may be implemented to interact with software aspects of a module.

Figure 3:
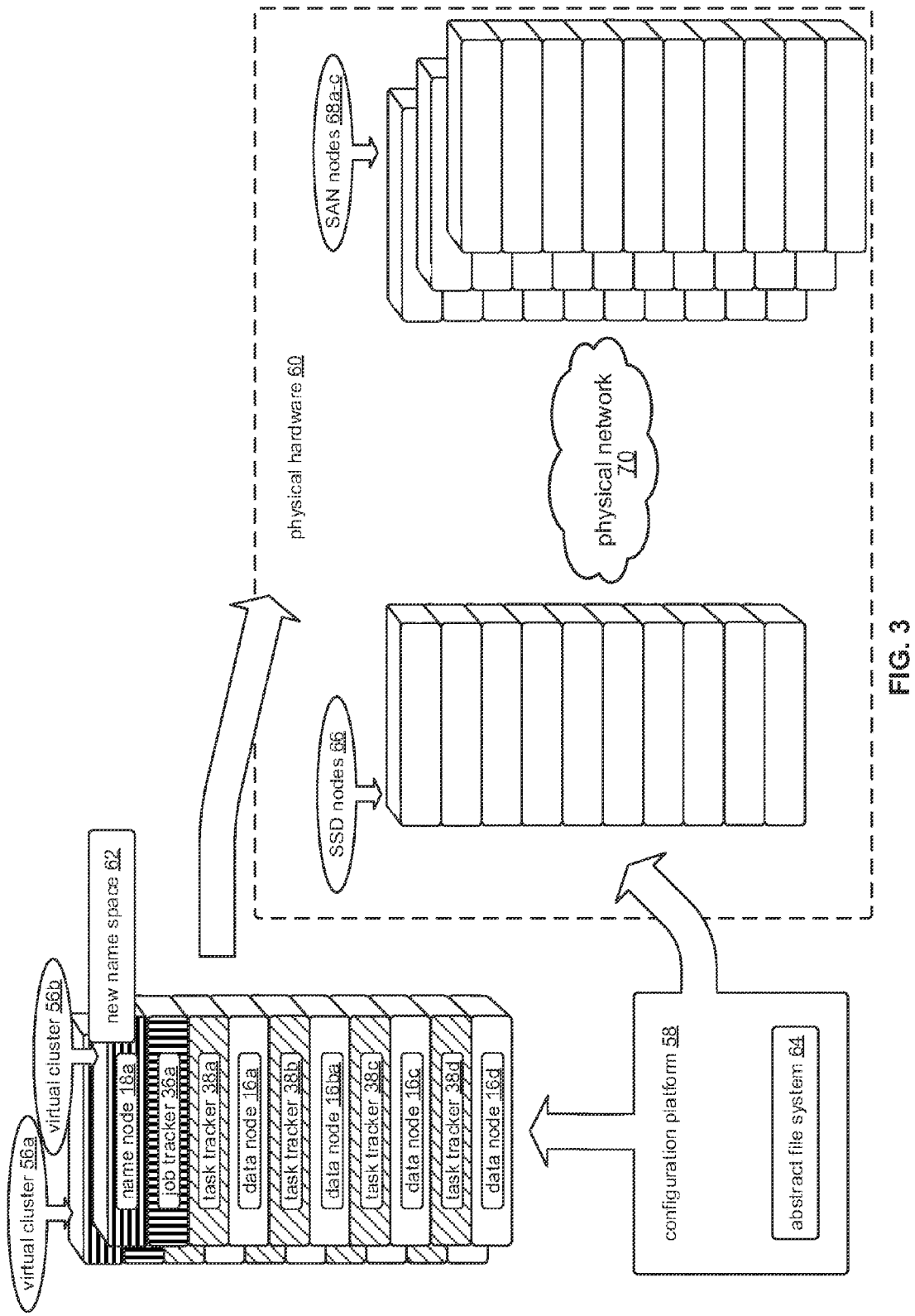
FIG. 3 is a schematic block diagram of a configuration of virtual clusters supported on various computing hardware communicatively coupled to various data sources, in accordance with various examples disclosed herein.

Referring to FIG. 3, an implementation of virtual clusters 56 consistent with a Hadoop approach is depicted. Although the virtual clusters 56 depicted in FIG. 3 are discussed below in terms of virtual clusters 56 consistent with a Hadoop implementation, any type of virtual clusters 56, such as open stack clusters 56 are possible. By adding one or more layers of abstraction, the abilities of the Hadoop approach discussed above may be extended through virtualization. Such innovations may provide a configuration platform 58 operable to configure any number of different virtual clusters 56 with any number of data nodes 16, name nodes 18, job trackers 36, and task trackers 38 on a wide variety of physical hardware 60.

Such additional layers of abstraction may involve a new name space 62. The new name space may 62 may be configured consistent with an abstract file system 64, which may reside with the configuration platform 58 or elsewhere, operable to store data blocks/replicas 24/26 in a virtual cluster 56. Additionally, safeguards and/or redundancies may be built into this new abstract file system 64 to address problems typical of flash memory, such as, without limitation, data retention problems, to allow data blocks/replicas 24/26 to be stored at the physical layer on Solid State Drives (SSD) 66 implementing such memory. Additional elements and/or abstractions provided to facilitate and configure virtual clusters 56 may be implemented on top of an existing Hadoop approach implementation in the user space, as opposed to the kernel space, of the Hadoop implementation.

The abstractions and/or additional elements discussed above may facilitate implementation and/or removal of virtual clusters 56 and/or additions to and/or removal of nodes 16/18 and/or trackers 36/38 from such virtual clusters 56 on the fly through the configuration platform 58. Virtualization may facilitate the creation of several nodes 40/42 on a single physical node 12. Additionally, the flexibility of virtualization may allow Hadoop implementations on more heterogeneous clusters 20, involving SSDs 66 and/or Hard Disc Drives (HDD) in a Storage Area Network (SAN) 68 for data storage functions communicatively coupled over a physical network 70 and protocols such as internet Small Computer System Interface (iSCSI). Additional details used to explain the implementation of virtual clusters 56 can be found in the provisional application mentioned above: U.S. Provisional Application Ser. No. 61/876,045, entitled Virtual Hadoop Clusters and filed on Sep. 10, 2013.

Such flexibility can pave the way for implementation of new technologies, such as cloud technologies in the Hadoop framework. Indeed such flexibility could literally lead to the use of physical resources anywhere in the world to support virtual hadoop clusters 56. Such flexibility, however, may have the potential to increase latencies already involved in running jobs. For example, retrieving a data block/replica 24/26 from a SAN 68 or a cloud service may take time. Such latencies required to prepare a cluster 20/56 for operations may be classified under the category of "warm-up" operations.

Operations to warm up a cluster 20/56 generate latency issues whether the cluster 20/56 is a virtual cluster 56 or not. Such warm-up operations may include loading a data block/replica 24/26 to a cache for processing, which may take significant time for sizes involved in distributed processing, such as those from 64 megabytes to gigabytes. Where the requisite block/replica 24/26 does not reside on a node 42/40 with available processing logic, warm-up latencies may be incurred in transferring the block/replica 24/26 to the requisite node via a network protocol. Such transfers may involve warming up relevant network resources. Additionally, one or more task trackers 38 may require time to spawn one or more JVMs to implement mappers 44 and/or reducers 52, which may also need to be provisioned to the requisite nodes 42/40. The foregoing is not intended as an exhaustive list of potential warm-up operations, but is provided only by way of illustration.

Furthermore, such flexibility may further open the door for even greater variability among the jobs provisioned to a data processing system. Additional variability may further complicate the efficiency with which those jobs are processed. By way of providing some non-exhaustive, non-limiting examples for purposes of illustration, clients may send data with high priority to those clients to a job store for processing that may be processed after lower priority jobs. Short jobs that could be processed quickly and/or during the provisioning of data blocks 24/26 for larger jobs may be processed inefficiently. Interdependencies between jobs and/or data overlap between jobs may not be leveraged. Jobs may not be scheduled to take advantage of common data blocks 24/26 available at or near processing logic as a result of a prior job. The time required to provision data blocks 24/26 for various jobs may not be accounted for in the scheduling of those jobs.

As can be appreciated, there may be several additional warm-up operations that may contribute to the latency of running a job. As also can be appreciated, there may be several additional scenarios resulting in scheduling inefficacies. The discussion with respect to the following figures explains innovations to reduce and/or remove scheduling inefficiencies and/or warm-up latencies.

Figure 4:
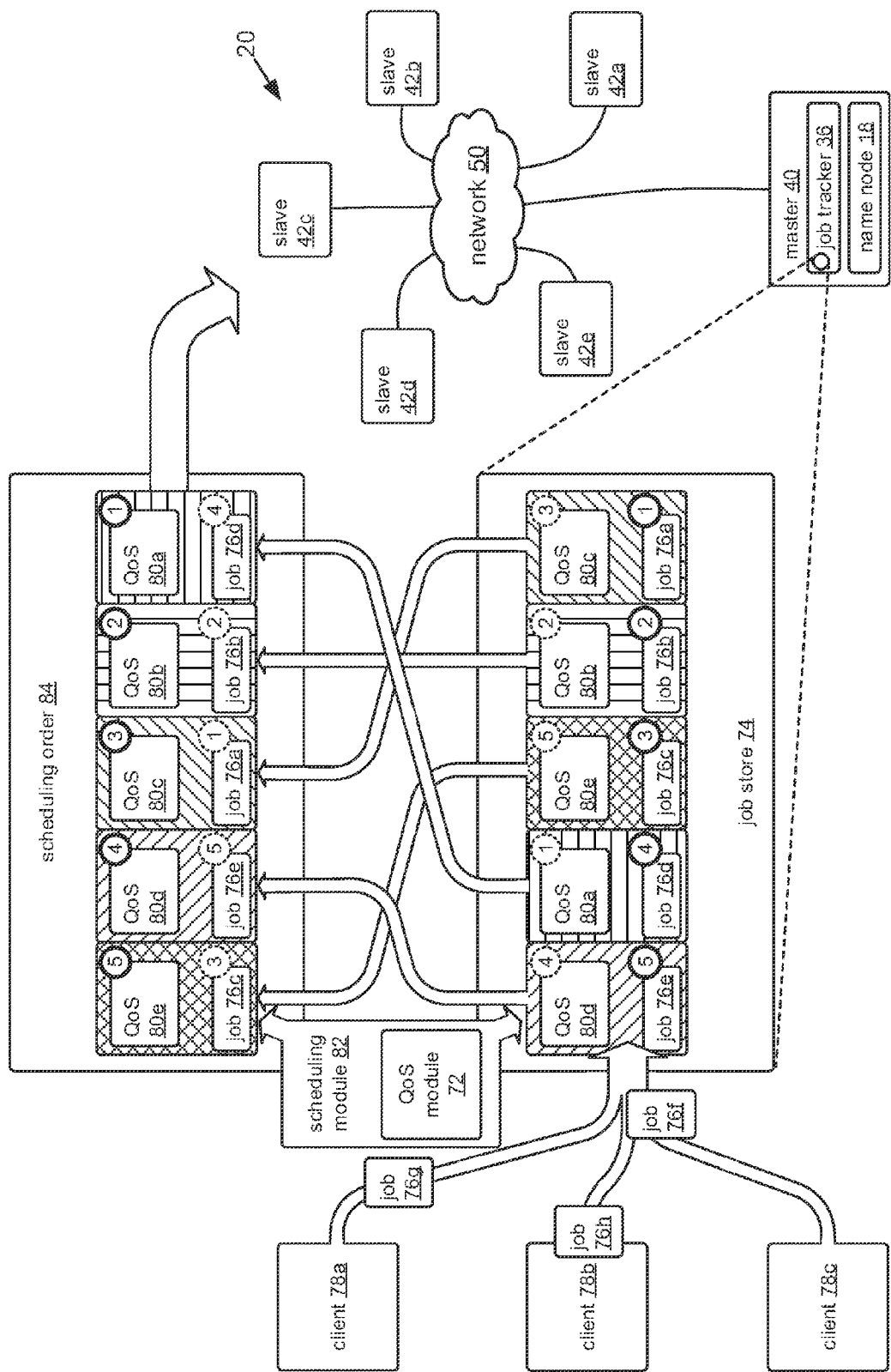
FIG. 4 is a schematic block diagram of a quality-of-service module and scheduling module generating a processing order for multiple jobs provisioned to a job store, the processing order arranged according to quality-of-service parameters provided with the jobs, in accordance with various examples.

Referring to FIG. 4, a quality-of-service module 72 is depicted. The quality-of-service module 72 may be implemented outside of a Hadoop implementation, such as in the user space, while being operable to interface with a job store 74. The job store 74 may be operable to store data-processing jobs 76a-h. A job 76 may be a data-processing job 76 that processes multiple data blocks 24/26 in parallel within a cluster of nodes 20/56 configured for parallel processing.

In some examples, the job store 74 may reside at a job tracker 36 overseeing a MapReduce engine/framework 28 sitting atop an ADFS 10 to which a name node 18 may pertain. The job store 74 may receive jobs 76 from one or more clients 78a-c. The job store 74 may receive the jobs 76 over one or more networked connections. In some examples, the job store 74 may be configured to serve as a job queue, which would, without intervention, determine an order for processing the jobs.

For purposes of illustration and not limitation, for example, the job store 74 may be configured to process jobs 76a-e in the job store 74 in a First In First Out (FIFO). In such a scenario, the job 76a on the right side of the job store 74 may be interpreted as both the first job 76a sent from a client 78 to the job store 74 and the next job 76a that the job store 74 would advance for processing, without an intervention. Conversely, the left most job 76*e* depicted in the job store 74 may be interpreted as both the last job 76*e* sent to the job store 74 from a client 78 and the last job 76*e* that would be processed without an intervention. As can be appreciated, the job store 74 may be configured for additional approaches, apart from FIFO, for determining when to run data-processing jobs in the job store 74, assuming no intervention.

However, for purposes of illustrating potential capabilities of the quality-of-service module 72, the jobs 76*a*-76*e* in the job store 74 display a number within an emboldened circle indicating the number in which the jobs 76*a*-76*e* were received by the job store 74. Although such a chronological ordering would be consistent with a FIFO configuration for the job store 74, the job store 74 may be operable to place the jobs 76*a*-*e* within some other queue order.

In some examples, one or more of the jobs 76*a*-*e* may be received with a Quality-of-Service (QoS) parameter 80*a*-*e*. A scheduler may include multiple job queues for multiple priority levels. For example, a job queue may be assigned priority between one and ten. Within a job queue, the jobs may be ordered in a FIFO order. A QoS parameter 80 may provide an additional parameter with which to reorder the jobs 76 in one or more queues. By way of example and not limitation, example QoS parameters may be based on desired response time, criticality, a contract level, a desired response, urgency, mission critical status, severity, and/or a need for real time execution, among other examples. Based on one or more QoS parameters, jobs 76 in a job queue may reordered and/or resources warming, provisioning, and the like may be directed.

Although not depicted, some jobs 76 may have multiple QoS parameters 80. One or more QoS parameters 80 may be included with a job 76 and/or be provided separately. One or more QoS parameters 80 may be provided with characterization information for a job 76 and/or may be the characterization information of the job 76. Furthermore, QoS parameters 80 may report one or more quantitative levels for a given job 76 and/or one or more qualitative priority categories for a given job 76.

For example, and not by way of limitation, a client 78 may be highly dependent upon the results from a job 76*a* in the job store 74 to continue with one or more processes that the client 78 may be running. In such a scenario, the client 78 may indicate a high level of priority in one or more QoS parameters 80 for the job. The high level or priority may be indicated with respect to multiple different metrics, such as, without limitation, a time frame in which the job 76*a* needs to be processed and/or one or more classifications of the job 76*a*, such as, without limitation, a system critical category. In some examples, a charge may be billed for processing a job 76, the value of which may depend on one or more QoS parameters 80 provided with the job 76. In such examples, higher charges may be billed for QoS parameters 80 reflective of higher scheduling orders.

The quality-of-service module 72 may be operable to read one or more QoS parameters 80 from characterization information for the job 76*a*. In some examples, the quality-of-service module 72 may be communicatively coupled to a scheduling module 82. The quality-of-service module 72 may provide the one or more QoS parameters 80 to the scheduling module 82. In such examples, the scheduling module 82 may be operable to schedule the job 76*a* relative to one or more other jobs 76*b*-*e* in a scheduling/processing order 84, irrespective of the order in which the jobs 76*a*-*e* reside in the job store 74.

To determine the scheduling order 84, the scheduling module 82 may apply a priority routine to the one or more QoS parameters 80 of the job 76*a* to determine a scheduling order. The scheduling module 82 may determine that the scheduling priority of the job 76*a* either meets or does not meet a predetermined requirement that would allow the job 76*a* to receive an advanced position in the scheduling order 84. In the scenario depicted in FIG. 4, this advanced position is at the front of the scheduling order 84, but other positions are also possible. In other examples, the scheduling module 82 may compare QoS parameters 80 from various jobs 76*a*-*e* to determine the relative position of the job 76*a* relative to other jobs 76*b*-*e*, where jobs 76 with higher scheduling priorities, in terms of the QoS parameters 80, are scheduled toward the front of the scheduling order 84.

The relative scheduling priorities, as derivable by the scheduling module 82 from QoS parameters 80*a*-*e* depicted in FIG. 4, are depicted on the jobs 76*a*-*e* in the job store 74 by numbers inside the dashed circles. As can be appreciated, in the job store 74, the jobs 76*a*-*e* are not lined up according to these numbers and, hence, by the priority of the jobs 76*e*, resulting in poor service for the clients 78*a*-*c*. Therefore, the scheduling module 82 may be operable to change the order of the jobs 76*a*-*e* to the scheduling order 84 depicted above the job store 74.

Depending on the example, the scheduling order 84 may be maintained in a parallel job queue, a parallel job store, parallel buffers, or simply as a data structure with information about an order in which the jobs 76*a*-*e* should be advanced out of the job store 76 for processing on the cluster 20/56, regardless of a current order of the jobs 76*a*-*e* in the job store 74. To visually emphasize a potential for changes between jobs 76*a*-*e* as they may be ordered in the job store 74 and a scheduling order 84 according to which the scheduling module 82 may schedule the jobs 76*a*-*e*, the different jobs 76*a*-*e* are depicted with different patterns of cross-hatching. Arrows are also provided to track the change in ordering.

As a result of the scheduling provided by the scheduling module 72, the scheduling order 84 may be made to reflect the different priority levels of the jobs 76*a*-*e*. Hence, the numbers associated with relative priority levels derivable from the QoS parameters 80*a*-*e* are now depicted, with respect to the scheduling order 84, with a solid bold circle around them in ascending order from right to left. The numbers indicative of the order in which the jobs 76*a*-*e* were received and/or queued by the job store 74, are no longer sequential and are surrounded by dashed circles in the scheduling order 84 produced by the scheduling module 82.

The scheduling order 84 may be interpreted as advancing the jobs 76*a*-*e* for processing on the cluster 20/56 from right to left, such that job 76*d*, the job with the highest priority, is processed first. Since the jobs 76*a*-*e* are scheduled in an order different from the order in which they arrive at the job store 74, the jobs 76*a*-*e* may be said to be processed asynchronously. However, there are many ways, apart from scheduling jobs 76 according to priorities indicated by QoS parameters 80, to improve performance through asynchronous scheduling.

In some scenarios, a large job 76 may have a highest priority and a highest QoS parameter 80. In such scenarios, the large job 76 may take up an undesirable share of the resources in the cluster 20/56, preventing any, or sufficient, progress with respect to relatively small jobs 76 and/or jobs 76 with relatively low values for one or more QoS parameters 80. Such scenarios may arise in examples consistent with some interpretations of FIG. 9, discussed below, where jobs 76 may be processed one at a time. These scenarios may reduce efficiency because one or more relatively small jobs 76 and/or jobs 76 with relatively low values for one or more QoS parameters 80, which could have been processed relatively quickly and with relatively few resources, may be forced to wait on the large job 76, which may take a significant amount of time to process.

To prevent such scenarios, the resources available to a given job 76 may be limited. By way of example and not limitation, such resources for a given job 76 may be limited through the use of a fair scheduling protocol. The use of a fair scheduling protocol, or some other such protocol, may be used to ensure that multiple jobs 76 receive at least a minimum level of resources and that no job 76 receives a disproportionate share of resources for a disproportionate amount of time when other jobs 76 are waiting.

Figure 5:
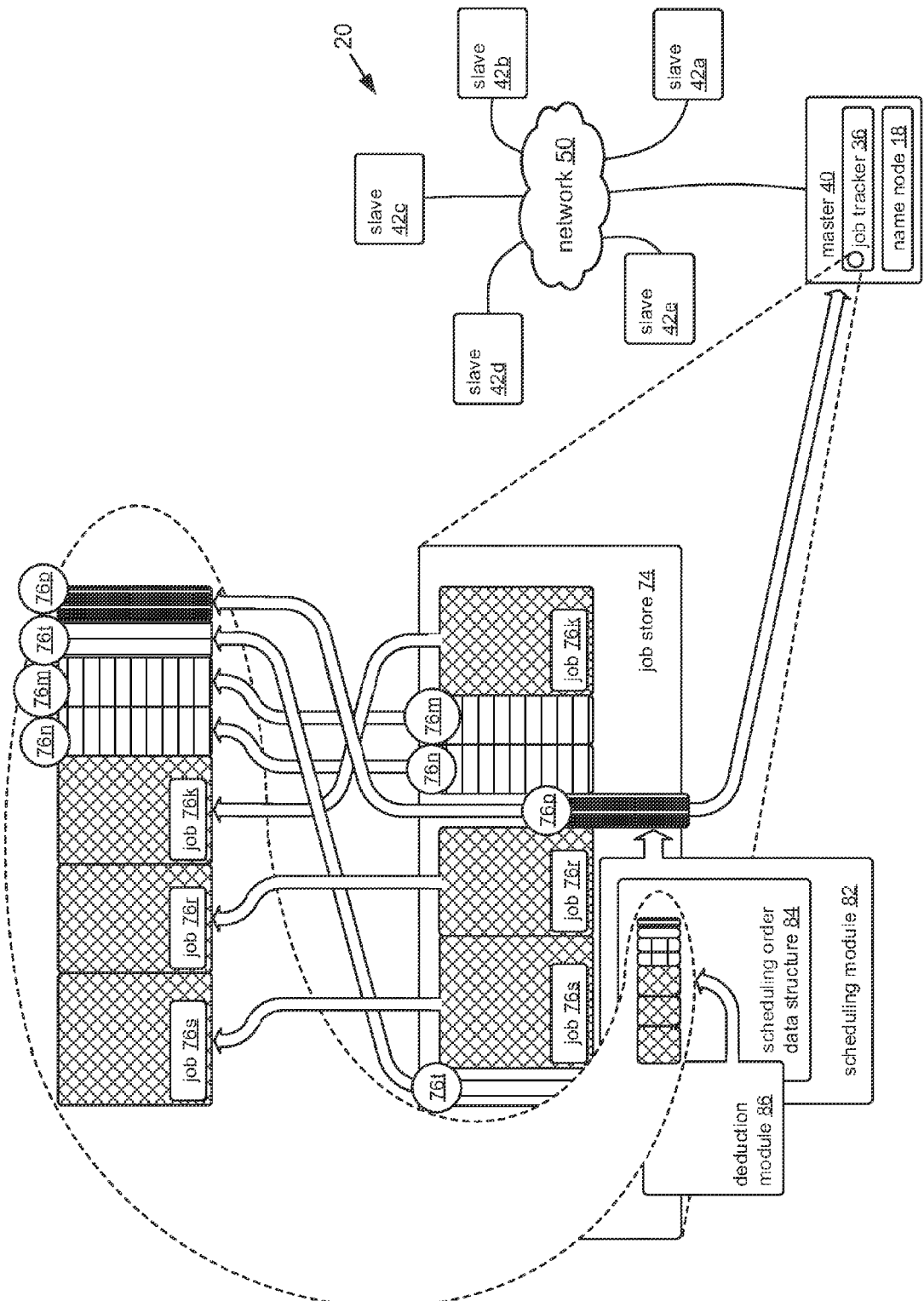
FIG. 5 is a schematic block diagram of a deduction module and a scheduling module generating a processing order for multiple jobs provisioned to a job store, the processing order arranged according to job properties derived from characterization information for the various jobs by the deduction module, in accordance with various examples.

Referring to FIG. 5, a deduction module 86 is depicted. The deduction module 86 may be implemented outside of a Hadoop implementation, such as in the user space, while being operable to interface with the job store 74. The deduction module 86 may be operable to analyze characterization information for jobs 76k-t in the job store 74. Additionally, the deduction module 86 may be operable to derive one or more job properties for one or more jobs 76k-t from the characterization information for those jobs 76k-t. In such examples, the scheduling module 82, which may be communicatively coupled to the deduction module 86, may be operable to schedule a given job 76p relative to other jobs 76k-n,r-t in accordance with one or more job properties for that job 76p.

By way of example and not limitation, the deduction module 86 may determine a job property in terms of the size of a job 76p. Without limitation, the deduction module 86 may determine size after identifying the number and/or size of data blocks 24/26 to be processed by the job 76p. In the example depicted in FIG. 5, the deduction module 86 derives relatively small sizes for jobs 76p and 76t. As an additional visual indication of their small size, these jobs 76p,t are depicted with vertical cross-hatching patterns. These jobs 76p,t may quickly be processed and the results returned to the client(s) 78 without having to wait unnecessarily for more involved jobs 76k,r,s. On account of the job property of their relatively small size, the scheduling module 82 may schedule these jobs 76p,t before relatively large jobs 76k,r,s. The scheduling order 84 may be stored in a data structure, such as, without limitation, a simple array.

The scheduling order 84 in FIG. 5 may be interpreted as in the previous figure. The right-most job 76p may be processed on a cluster of nodes 20/56 first, followed by the next-most-right-positioned job 76t and so on until the most left positioned job 76s. The scheduling module 82 may be operable to advance the most advanced job 76p in the scheduling order 84 for processing on the cluster 20/56, regardless of the job's 76p position in the job store 74.

Other properties may play a role in determining the scheduling order 84. For example, two or more jobs 76m and 76n, may be related to one another in one or more ways, such as, without limitation, a second job 76n may be dependent on an outcome for the first job 76m. As an additional visual indication of relatedness, related jobs 76m,n are both depicted with horizontal cross-hatching patterns. The scheduling module may be operable to schedule the related jobs 76m,n accordingly, such as one after the other.

The scheduling module 82 may also be operable to privilege certain job properties above others. For example, the scheduling module 82 may give a higher priority to job size as opposed to job relatedness. Hence, in FIG. 5, the relatively small jobs 76p,t are processed before the jobs 76m,n, which although smaller than some jobs 76k,r,s, are larger than jobs 76p,t. Some jobs 76k,r,s may not have derivable properties that would warrant privileging the order in which they are processed and hence may retain their order in the job store 74 with respect to one another.

Figure 6:
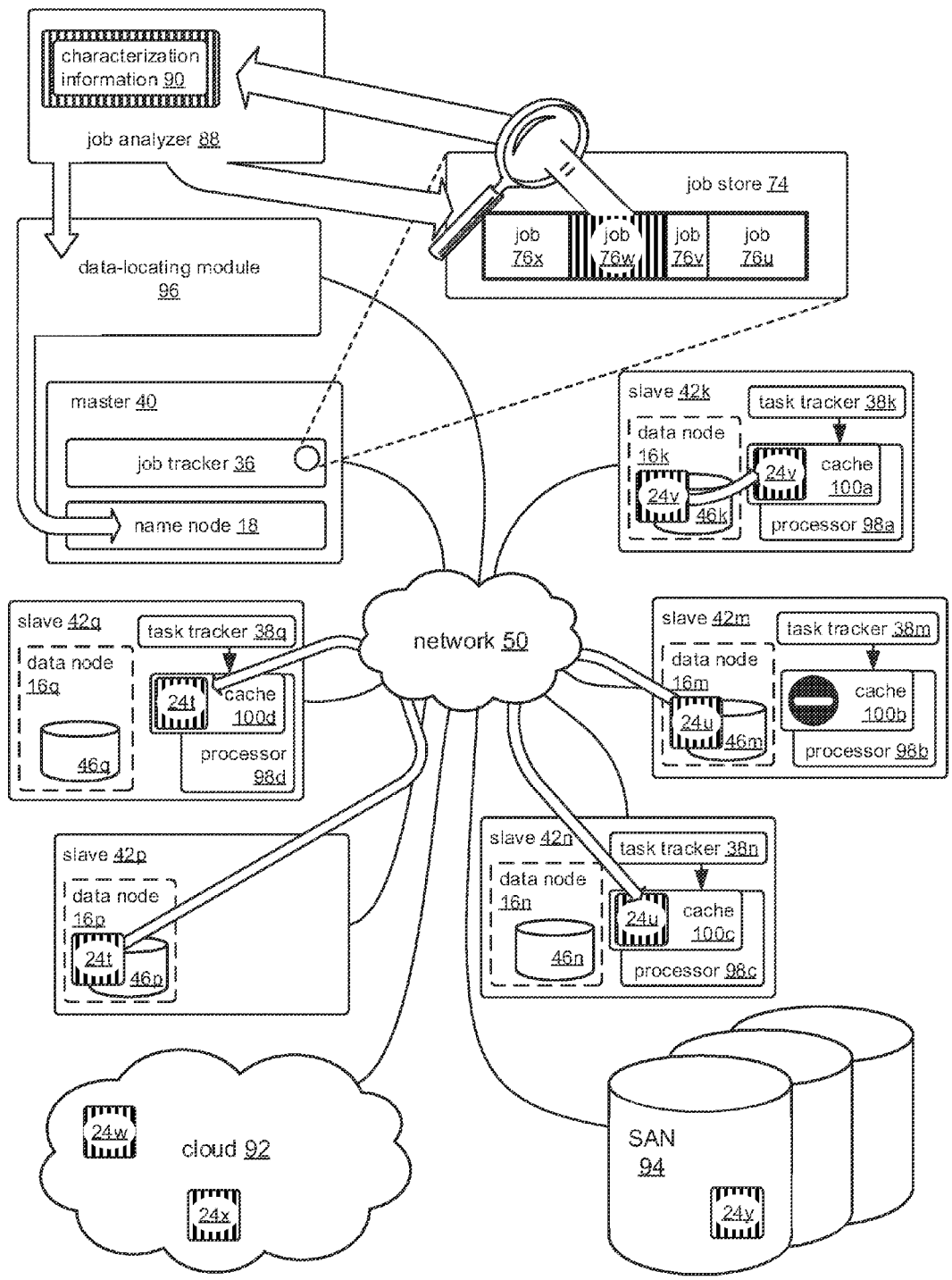
FIG. 6 is a schematic block diagram of a job analyzer reading characterization information from a job in a job store, together with multiple data blocks to be processed by the job and locations in a network at which the multiple data blocks may be stored and processed, in accordance with various examples.

Referring to FIG. 6, a job analyzer 88, which may be implemented as a module, is depicted. The job analyzer 88 may be implemented outside of a Hadoop implementation, such as in the user space, while being operable to interface with a job store 74. The job analyzer 88 may be operable to read characterization information 90 from a job 76w in the job store 74. Additionally, the job analyzer 88 may be operable to identify multiple data blocks 24t-y to be processed by the job. Depending on the example, the term multiple data blocks 24/26 may encompass a complete set of data blocks 24/26 to be processed during a job 76, or only a portion thereof.

The data blocks 24t-y to be processed during the job 76w may be stored at various locations across a network 50, including areas outside of a cluster of nodes 20/56. For example, one or more data blocks 24w,x may be located within the cloud 92. As another non-limiting example, one or more data blocks 24y may be located on a Storage Area Network (SAN) 94. Other data blocks 24t-v may be stored at nodes 42m,p,q within a cluster of nodes 20/56 configured to coordinate the parallel processing of data blocks 24/26. In some of such examples, the data blocks 24t-v may be stored by data nodes 16k,m,p residing at slave nodes 42k,m,p. The blocks 24t-v may be stored in storage volumes 16k,m,p implemented on SSD, Hard Disk Drives, or any other medium for storing data.

Some examples may include a data-locating module 96. The data-locating module 96 may be implemented outside of a Hadoop implementation, such as in the user space, while being communicatively coupled to the network 50 and/or the job analyzer 88. The data-locating module 96 may be operable to locate one or more storage locations 46k,m,p at which one or more data blocks 24/26 are stored. The data-locating module 96 may acquire information about data blocks 24t-y identified by the job analyzer 88 as data blocks 24/26 to be processed by a given job 76w. The data-locating module 96 may then determine storage locations for these identified data blocks 24t-y.

In some examples involving Hadoop approaches, the data-locating module 96 may leverage the locational awareness of Hadoop approaches by referencing information in the name node 18 residing at the master node 40 for the cluster 20/56. The information in the name node 18 may provide the storage locations for the data blocks 24t,u,v to be processed. For data blocks 24w,x,y in the cloud and/or on a SAN, the job analyzer may acquire location information directly the relevant jobs and/or location information may be communicated by a client 78 providing the job 76.

For additional examples, that data-locating module 96 may be further operable to assign an estimated provisioning time for the data blocks 24t-y to be processed during the job. The estimated provisioning time may involve time to transfer a data block 24/26 from a storage location at a given node 42 to processing logic residing at that node. For example, referring to the slave node 42k depicted in the upper right quadrant of FIG. 6, the estimated provisioning time may include time to move a given data block 24v from a storage volume 46k for a data node 16k at a slave node 42k to processing logic 98a at that slave node 42k, which may be, without limitation, a processor. This estimated provision time may also include the time to load the data block 24v into a cache 100a for the processing logic 98a.

Referring to the bottom two slave nodes 42m,n on the right side of FIG. 6, the provisioning time may need to be enlarged where a data block 24u pertaining to the job 76w is stored at a node 42m at which the processing logic 98b is currently occupied, as indicated by the occupied symbol in the cache 100b for the processor 98b at node 42m. In such a scenario, the estimated processing time may need to be enlarged to accommodate time to warm up one or more relevant network resources in the cluster 20/56 used to relay the data block 24u to another node 42n with adequate and available processing logic 98c. Additionally, time may need to be allocated to allow the data block 24u to be transferred over the network 50.

Similarly, a data block 24t may be stored at a node 42p without processing logic. Such a scenario may require similar adjustments to an estimated provisioning time to transfer the data block 24t to another node 42q and processing logic 98q residing there. In such examples, the data-locating module 96 may use locational information and/or information about nearby processing logic 98 from the name node 18 and/or the job tracker 36 at the master node 40 to assign an estimated provisioning time. The scheduling module 82 may then schedule the job 76w relative to the other jobs 76u,v,x to give time to provision the data blocks 24t-y pertaining to the job 76w.

Additional scenarios in which the data-locating module may enlarge the estimated provisioning time may include scenarios where one or more data blocks 24w-y need to be provisioned from the backend. Such scenarios may include a scenario where one or more data blocks 24w-y need to be retrieved from the cloud 92. A similar scenario may involve the retrieval of one or more data blocks 24y from a backend storage system, such as a SAN 94. Due to the time involved in provisioning data blocks 24/26 in such scenarios, the data-locating module 96 may be operable to assign the estimated provisioning time for the job 76w such that the estimated provisioning time is greater than the maximum time used to determine whether to schedule at least one other job 76 before the job in question 76w.

Figure 7:
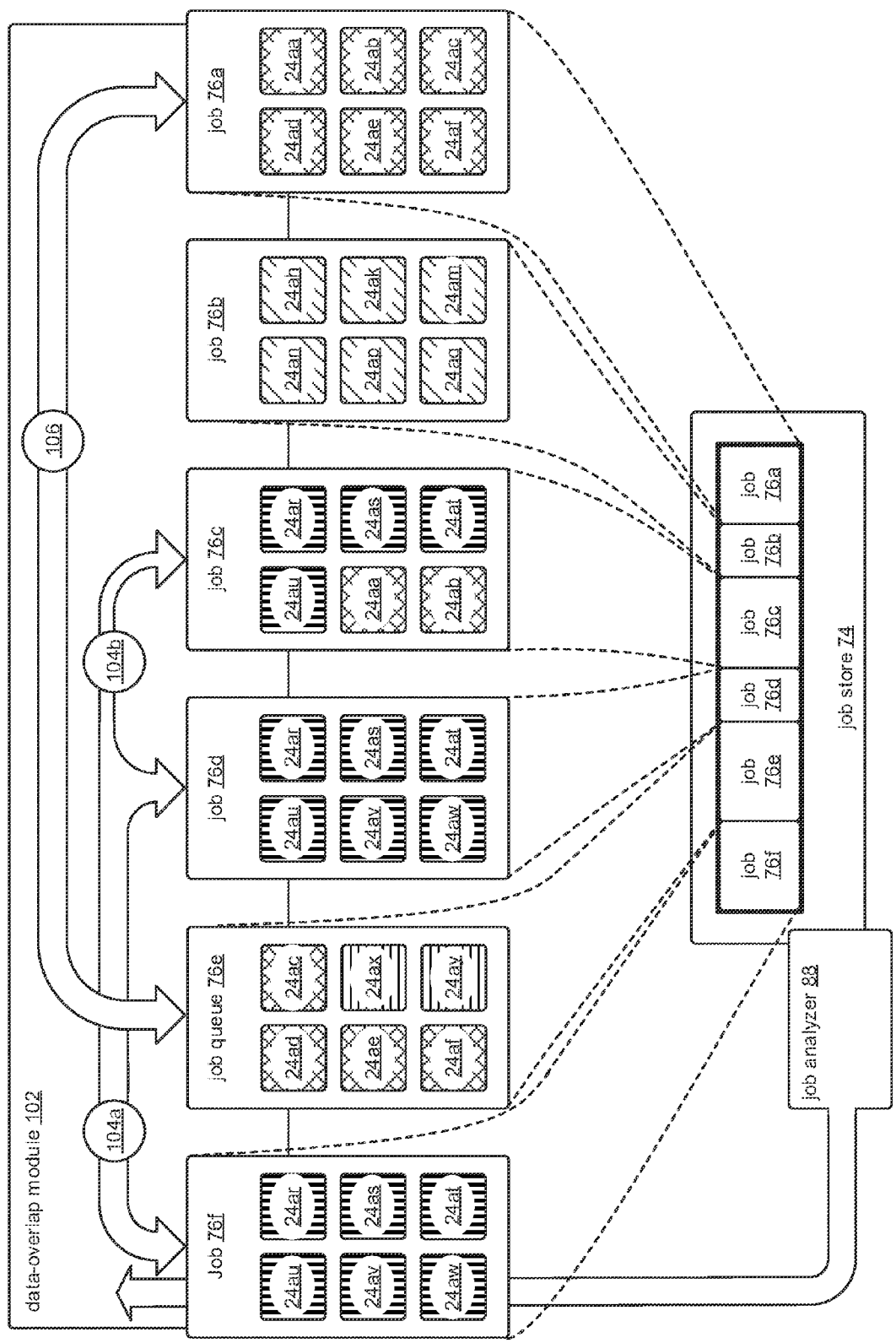
FIG. 7 is a schematic block diagram of a data-overlap module that has identified groups of jobs in a job store based on degrees of overlapping data blocks to be processed by the various jobs, in accordance with various examples.

Referring to FIG. 7, a data-overlap module 102 is depicted. A data-overlap module 102 may be implemented outside of a Hadoop implementation, such as in the user space. The data-overlap module 102 may leverage overlap between data-blocks 24/26 to be processed by different jobs 76 to reduce and or eliminate provisioning times. Such reductions and/or elimination of provisioning times may be achieved through the scheduling of a job to process certain data-blocks 24/26 after a job 76 that also processes those data-blocks 24/26 so that they can be processed while they are still provisioned to the requisite processing logic 98.

The data-overlap module 102 may be communicatively coupled to the job store 74 and/or the job analyzer 88. The data-overlap module 102 may acquire information identifying data blocks 24aa-ay for multiple jobs 76a-f in the job store 74. The information may indicate to which jobs 76a-f the various data blocks 24aa-ay pertain. By making comparisons between the data blocks 24/26 for individual jobs 76, the data-overlap module 102 may be able to determine degrees of overlap between the data blocks 24/26 to be processed by the various jobs.

For example, the data-overlap module 102 may detect that the last job 76f and the second-to-last job 76d both process the same data blocks 24ar-aw. The data-overlap module 102 may, in such cases, assign a high degree of overlap, such as, without limitation, 100%, to the pair 104a of jobs 76d,f. If the second to last job 76e is processed between these two jobs 76d,f, the same data blocks 24ar-aw will have to be provisioned twice. Conversely, if the processing order is changed so that the jobs 76d,f with common data blocks 24ar-aw are processed one after the other, the common data blocks 24ar-aw only need to be provisioned once, saving on time and/or resources. For example, where a data block to be processed by an impending job is found to already have been provisioned and/or to be in the cache, further action may not be required.

The data-overlap module 102 may also detect a smaller degree of overlap between the pair 104a discussed above and the third-from-front job 76c in the job store 74. This smaller degree of overlap may suggest another grouping 104b that includes three jobs 76c,d,f, even though the third-from-front job 76c includes two data blocks 24aa-ab, that are not included in either job 76d,f in the first pair 104a. As can be appreciated, the two differing data blocks 24aa-ab do not match any data blocks 24ar-aw in the pair 104a, they do match two blocks 24aa-ab in the first job 76a. However, the degree of overlap between the third-from-front job 76c is greater, involving twice as many data blocks 24ar-au.

The data-overlap module 102 may also suggest another pairing 106 between the first data block 76a and the second-to-last data block 76e. Although the degree of overlap is not complete, it does involve several data blocks 24ac-af. The data-overlap module 102 may report a separate degree of overlap between each potential pairing of jobs, or any subset thereof. For example, the data-overlap module may report a separate degree of overlap between the third job 76c and the first job 76a, the third job 76c and the third-to-last job 76d, and the third job 76c and the last job 76f, while not reporting on potential pairings without any overlap. Because the third job 76c shares data blocks 24 with both the first pair 104a and the latest pairing 106 it may prove as an efficient scheduling bridge between the two. The second job 76b in the job store 74 does not share any overlap with the other jobs 76a,c-f in the job store and may, therefore, be scheduled either before or after these other jobs 76a,c-f.

From the preceding discussion, it can be appreciated that it can take significant time to provision the data blocks 24/26 necessary to process a job 76. Significant efficiencies may be gained by reducing and/or eliminating these warm-up, or provisioning, requirements. Under such scenarios, a job 76 may be thought of as being processed in "real time" because there is no down time preparing to process the job 76. The foregoing discussion has provided explanations of innovations to foster such real-time processing. Additional innovations that promote real-time processing are discussed below.

Figure 8:
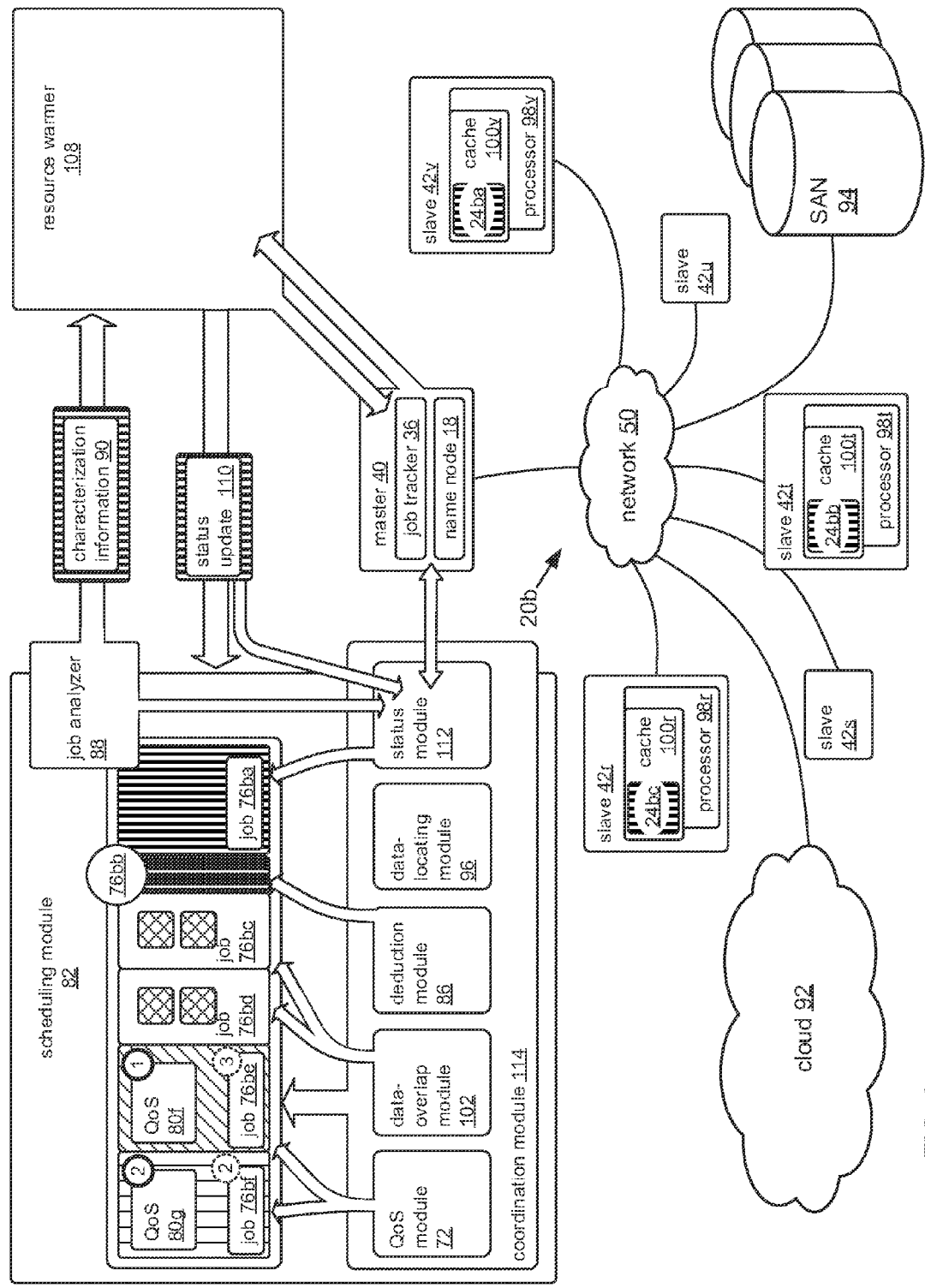
FIG. 8 is a schematic block diagram of a control manager warming up a portion of a cluster on which a data-processing job runs by moving data blocks to be processed by the job to processing logic, also depicted is the collection of status update information used to contribute to a processing order for several jobs ultimately determined by a coordination module receiving input from various sources, in accordance with embodiments of the present invention, in accordance with various examples.

Referring to FIG. 8, a control manager 108 is depicted. The control manager 108 may be communicatively coupled to a network 50 with access to the data blocks 24/26 to be processed by jobs 76 in the job store 74. The control manager 108 may be operable to receive characterization information 90 from the job analyzer 88 and/or information derived from the characterization information 90, such as information identifying the multiple data blocks 24/26 to be processed during a given job 76.

The control manager 108 may be connected over the network 50 to a master node 40 for a cluster of nodes 20/56 on which jobs 76 in the job store 74 may be processed. The control manager 108 may utilize resources at the master node 40, such as the job tracker 36 and/or the name node 18 to begin to provision the multiple data blocks 24/26 pertaining to a given job 76a before it is scheduled for processing. The multiple data blocks 24/26 may be provisioned from multiple storage locations where they are stored to multiple instances of processing logic 98 within the cluster 20/56. In such examples, a scheduling module 88 may be operable to schedule a job 76a for which the control manager 108 is provisioning data blocks 24/26 for a processing time after a provisioning-completion threshold has been reached with respect to the process of provisioning the jobs 76a data blocks 24/26.

Such a provisioning-completion threshold may require that the provisioning process be completed, or only a portion thereof. By way of non-limiting examples, the provisioning-completion threshold may require a percentage of data blocks 24/26 be provisioned and/or data blocks 24/26 from certain types of storage locations be provisioned. Such types of storage locations may include, without limitation, storage locations on nodes with the requisite processing logic 98, storage locations within the cluster of nodes 20/56, storage locations on the backend, such as in the cloud 92, or on a SAN 94. As another non-limiting example, the provisioning-completion threshold may require one or more data blocks 24/26, or percentage thereof, to reach one or more stages in their progression in arriving at the processing logic 98 where they will be processed. Non-limiting examples of such stages may include arriving at the cluster 20/56, arriving at a node, or being within a number of nodes, at which the data block 24/26 will be processed.

As discussed above, each node 40/42 in the cluster of nodes 20/56 may be provided with a web server. Such web servers may be utilized to facilitate the collection of information about the progress of a provisioning process. In some examples, the control manager 108 may collect this information. The control manager may then forward this information as status updates 110 to the scheduling module 82 and/or a status module 112. In other examples, the process of provisioning may be monitored, without limitation, by the scheduling module 82 and/or a status module 112.

For example, the status module 112 may be operable to track provisioning-status information for a set of data blocks 24/26 common to the multiple data blocks 24/26 pertaining to one or more jobs 76 in the job store 74. Such provisioning-status information may indicate, without limitation, that the set of data blocks 24/26 is provisioned to a set of processing logic instances 98. Similarly, the provisioning-status information may indicate that the set of data blocks 24/26, or subset thereof, are still in the process of being provisioned to the set of instances of processing logic 98 and/or one or more stages in the provisioning process at which one or more of the data blocks 24/26 has arrived. This provisioning-status information may be used to select a job 76*a* from the job store 74 for processing, potentially with the aid of the data-overlap module 102. Such a job 76*a* may have a degree of overlap between the data blocks 24/26 it processes and the set of data blocks 24/26, which the provisioning-status information may indicate may include one or more data blocks 24/26 that have obtained an advanced and/or completed stage of processing.

In some examples, the scheduling module may acquire information identifying data blocks 24/26 and/or the job(s) 76 to which they pertain in the job store 74 from the job analyzer 88. By way of a non-limiting example, the job analyzer 88 may identify data blocks 24/26 pertaining to a job 76 entering the job store. The status module 112 may acquire this information and track the provisioning status of these data blocks 24/26. The status module 112 may be further operable to provide provisioning-status information for jobs 76 in the job store. In some examples, the status module 112 may utilize the name node 18 and/or the job tracker 36 at the master node 40 to facilitate its tracking activities. In certain examples, status module 112 may track provisioning activity in the network generally, which may later be correlated to jobs 76 in the job store 74. In some examples, the scheduling module 82 may schedule a job 76 for processing when it receives an indication that its corresponding data blocks are at an advanced stage of provisioning.

As can be appreciated, in some examples, there may be several competing factors favoring different scheduling orders 84 for jobs 76 from the job store 74. A coordination module 114 may be provided to address such issues. The coordination module 114 may be operable to weigh and/or synthesize such factors to provide an overarching scheduling order 84 that may be informed by many different types of scheduling information.

For example, the status module 112 may provide one or more instances of provisioning status information to the coordination module 114. A quality-of-service module 72 may provide one or more quality-of-service parameters for one or more jobs 76 to the coordination module 114. Similarly, a deduction module 86 may provide one or more job properties for one or more jobs 76 to the coordination module 114. A data-locating module 96 may provide one or more estimated provisioning time(s) for one or more jobs 76 to the coordinating module 114. In like manner, a data-overlap module 102 may provide one or more degrees of overlap between jobs 76 to the coordinating module 114. One or more additional modules may also provide information about factors relevant to determining a scheduling order 84.

The coordination module 114 may proceed to reconcile all of the various considerations provided to it in deriving a scheduling order 74. By way of illustration, a non-limiting example is provided in FIG. 8. In the example, the status module 112 receives and/or collects provisioning status information 110 that the relevant data blocks 24*ba-bc* for a given job 76*ba* are provisioned. The status module 112 may then provide this provisioning status information to the coordination module 114. Since the relevant data blocks 24*ba-bc* are already provisioned, meaning that the corresponding job 76*ba* can be run in real time, the coordination module 114 may privilege this scheduling factor above others and schedule the corresponding job 76*ba* first, as depicted as the rightmost job 76*ba* with vertical cross-hatching in the scheduling order 74.

In such a scenario, the corresponding job 76*ba* is given first position even though the deduction module 86 has provided a job property indicating that another job 76*bb* involves the least amount of data processing, suggesting it might be taken care of quickly first. The coordination module 114 may recognize the small size by scheduling the small job 76*bb* second. However, in other examples information from about a job property may be more important and receive an earlier scheduling than information about provisioning status.

Next, the coordination module may determine to privilege information about a degree of overlap from the data-overlap module 102 indicating that two jobs 76*bc-bd* share overlapping data blocks 24/26 to be processed, as indicated by the four squares within these jobs 76*bc-bd* sharing a diamond cross-hatching pattern. The coordination module 114 may then privilege the quality-of-service parameters for the last two jobs 76*be-bf*, indicating a scheduling for the job 76*be* with the higher quality-of-service parameter(s) first. In many examples, the coordination module 114 may consider the various factors jointly, as opposed to simple prioritizing them, applying different weights to different factors and/or different indicators relative to those factors. The scheduling module 82, which may be communicatively coupled to the coordination module 114, may then ensure the scheduling of the jobs 76 in the job store 74 according to the resultant scheduling order 74.

Figure 9:
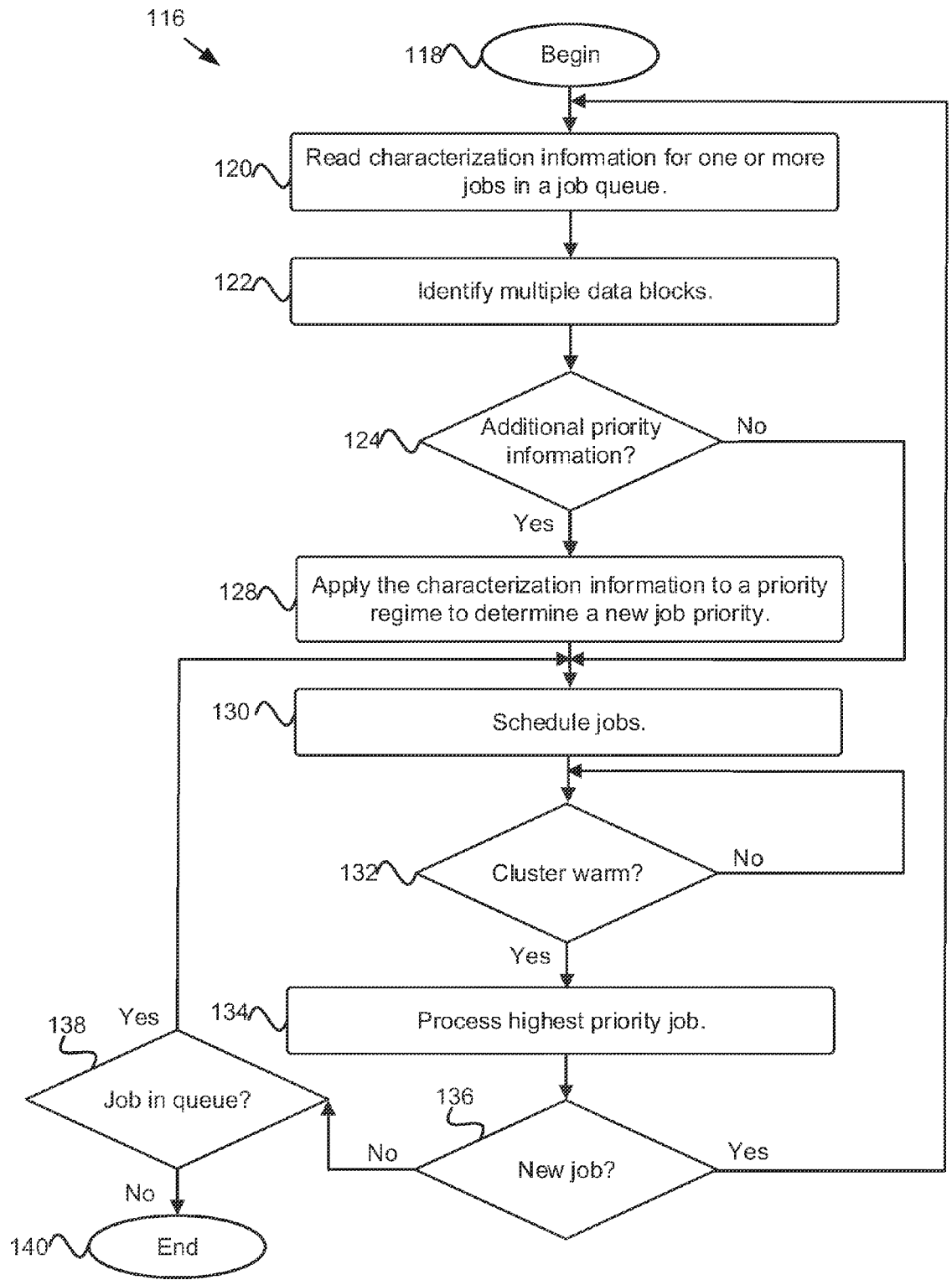
FIG. 9 is a flow chart of methods for warming-up a portion of a cluster of nodes in anticipation of running a job and/or scheduling and processing the job relative to other jobs with characterization information about that job, in accordance with various examples.

Referring to FIG. 9, methods 116 are depicted for efficiently scheduling-parallel processing jobs. The flowchart in FIG. 9 illustrates the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The methods 116 may begin 118 by reading characterization information 90 from one or more jobs 76 in a job store 74. The methods 116 may identify multiple data blocks 24/26 to be processed during a given job 76. If additional priority information 24 is present, the method may 128 apply the characterization information to a priority regime. The method 116 may then schedule the job(s) in the job store 74 according to the resultant priority. Where there is not additional priority information, the method 116 may continue to the scheduling step 130. The multiple data blocks 24/26 may be processed during the job 76 at multiple locations in a cluster of nodes 20/56.

To increase an opportunity for the multiple data blocks 24/26 to progress to multiple instances of processing logic 98 prior to the processing of the corresponding job 76, the method 116 may make a determination about whether the cluster of nodes 20/56 is warmed-up to processes the job 76. The cluster of nodes 20/56 may be warmed up when one or more of the multiple data blocks 24/26 have been fully provisioned and/or have reached an advanced stage of provisioning, as discussed above. The method 116 may 130 reschedule a job 76. The job 76 may be rescheduled 130 to give the cluster 20/56 time to sufficiently warmed up for the job 76.

Once a time is determined at which the cluster of nodes 20/56 is warmed up, the job 76 can be scheduled for that time and 134 processed.

FIG. 9 may be interpreted as consistent with jobs 76 being processed sequentially, one at a time. However, as discussed above, in some examples, multiple jobs 76 may be processed on a cluster of nodes 20/56 simultaneously. In such examples, various steps set forth in FIG. 9 may be reordered and/or may be implemented concurrently.

A new job determination 136 can be made to determine if a new job 76 has been received at the job store 74. Where a new job 76 is present, the process may begin anew with reading 120 characterization information. Where a new job 76 is not present, the method 116 may make an empty-job-store determination 138. If the job store 74 is not empty, the method 116 may return to the scheduling step 130 to ultimately process the next highest priority job 76. If the job store 74 is empty, the process may end 140.

In some examples, the method 116 may involve provisioning the multiple data blocks 24/26 to multiple instances of processing logic 98 in anticipation of processing the job 76 to which they pertain. In such examples, the method 116 may monitor the multiple data blocks 24/26 during provisioning and provide priority information when the provisioning has satisfied a completion standard. The corresponding job 76 may be scheduled for processing for a time at which provisioning has satisfied the completion standard.

In some examples, the method 116 may further involve reading a quality-of-service parameter for the job within the characterization information and providing this priority information. In such examples, the scheduling step may also involve scheduling a given job 76 to be processed before another job 76 because of an indication of higher priority in the quality-of-service parameter. Similarly, the scheduling step may also involve scheduling the given job 76 after the other job 76 because of an indication of lower priority in the quality-of-service parameter.

In such examples, or in other examples, the method 116 may include deriving a size of a given job 76 from the characterization information. In such examples, the methods 116 places the job 76 in relation to another job 76 with respect to a processing order 84 such that the job 76 is placed before the other job 76 where the size is at least one of below a minimum threshold and smaller than a second size of the other job 76.

In some examples, the scheduling step 130 may be proceeded by monitoring a set of data blocks 24/26 in terms of their location with respect to multiple instances of processing logic 98 residing at nodes in a cluster of nodes 20/56 coordinated for parallel processing of jobs 76. In such examples, scheduling may involve selecting a job 76 from multiple jobs 76 in a job store 74. The selection may be made based on an overlap between the multiple data blocks 24/26 and a subset of data blocks 24/26 with heightened availability with respect to the multiple processing jobs 76. The method 116 may then process the job 76 to take advantage of the heightened availability of the subset of data blocks. In some non-limiting examples, heightened availability may mean that one or more subject data blocks 24/26 may be stored in the cache 100 for one or more instances of processing logic 98.

In such examples, the monitoring of the set of data blocks 24/26 may be carried out to determine which data blocks 24/26 are already in cache 100 for processing logic 98 residing at nodes 42 in the cluster of nodes 20/56 coordinated for the parallel processing of jobs 76. Furthermore, a particular job 76 may be selected from multiple jobs 76 in the job store 74 with a subset of data blocks 24/26 of the multiple data blocks 24/26 to be processed by the particular job 76 that may be equal to or greater than a threshold value. Non-limiting examples of such a threshold value may include a number of data blocks 24/26 or a percentage of data blocks 24/26 relative to the multiple data blocks 24/26 to be processed by the particular job 76. Also, in such examples, the particular job 76 may be processed 134 to take advantage of the subset of data blocks 24/26 already in cache 100.

Heightened availability may also mean that the process of provisioning one or more subject data blocks 24/26 has begun. In yet another example, heightened availability may mean that one or more subject data blocks 24/26 is stored in close proximity to processing logic.

The method 116 may include comparing the multiple data blocks 24/26 of the job 76 to multiple sets of data blocks 24/26, each set of data blocks 24/26 pertaining to a job 76. The method 116 may then proceed by selecting an overlap job 76 with a degree of overlap between the multiple data blocks 24/26 and a set of data blocks 24/26 pertaining to the overlap job, which may be considered priority information. To take advantage of the degree of overlap and reduce provisioning time and/or resources, the method 116 may 130 schedule the job 76 and overlap job 76 in close proximity to each other.

The scheduling step may be proceeded in some examples, by determining, for a given job 76, locations for multiple data blocks 24/26 within a network 50 for that job 76. The method 116 may estimate a time to provision the multiple data blocks 24/26 from the locations to the multiple instances of processing logic 98. The method 116 may then use the estimate, as priority information, to 130 schedule the job 76 relative to another job 76 to allow for at least a portion of the time estimated to provision the multiple data blocks 24/26 from the locations. During this time, the method 116 may proceed by beginning to provision the multiple data blocks 24/26 to the multiple instances of provisioning logic 98.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A non-transitory computer-readable medium with instructions stored thereon, that when executed by a processor, perform steps comprising:
    identifying multiple data blocks to be processed by a job, in a job store, from characterization information for the job, the multiple data blocks stored at multiple storage locations;
    warming up the cluster in anticipation of processing the job to which the multiple data blocks pertain by transferring the multiple data blocks from the multiple storage locations to cache for available processing logic at multiple nodes as the cluster processes a prior job; and
    beginning to process the job upon a completion threshold for the transferring of the multiple data blocks being reached, privileging the completion threshold over another scheduling factor and avoiding latencies from the transferring of the multiple data blocks.

2. The non-transitory computer-readable medium of claim 1, further comprising instructions stored thereon executable by a processor to perform steps of:
    monitoring the transferring of the multiple data blocks from the multiple storage locations to cache for the available processing logic at the multiple nodes; and
    providing status information that the completion threshold has been reached.

3. The non-transitory computer-readable medium of claim 1, further comprising instructions stored thereon executable by a processor to perform steps of:
    locating the multiple storage locations of the multiple data blocks, and
    assigning an estimated provisioning time for transferring the multiple data blocks from the multiple storage locations to cache for the available processing logic at the multiple nodes; and
    scheduling the job with a processing order relative to another job from the job store that places the job at least one of:
        behind the other job where the estimated provisioning time is at least one of greater than a maximum time and greater than a second estimated provisioning time for the other job;
        before the other job where the estimated provisioning time is at least one of less than a minimum time and less than the second estimated provisioning time for the other job.

4. The non-transitory computer-readable medium of claim 3, further comprising instructions stored thereon executable by a processor to a perform step of:
    assigning the estimated provisioning time such that the estimated provisioning time is at least one of greater than the maximum time and greater than the second estimated provisioning time where at least one of the multiple storage locations is located outside of the cluster of nodes.

5. The non-transitory computer-readable medium of claim 1, further comprising instructions stored thereon executable by a processor to perform steps of:
    determining an original degree of overlap between the multiple data blocks and a set of data blocks subject to a comparison job;
    scheduling the job relative to other processing jobs to prevent a potentially-intervening job from being scheduled between the job and the comparison job where the potentially-intervening job has a lesser degree of overlap, with respect to at least one of the job and the comparison job, than the original degree of overlap.

6. The non-transitory computer-readable medium of claim 1, further comprising instructions stored thereon executable by a processor to perform steps of:
    tracking provisioning-status information for a set of data blocks common to the multiple data blocks that is at least one of provisioned to a corresponding set of instances of processing logic and in a process of being provisioned to the set of instances of processing logic;
    selecting the job because of a degree of overlap between the multiple data blocks and the set of data blocks; and
    advancing the job for processing.

7. The non-transitory computer-readable medium of claim 1, further comprising instructions stored thereon executable by a processor to perform steps of:
    reading a quality-of-service parameter from the characterization information of the job;
    transferring the multiple data blocks of the job from the multiple storage locations to cache for the available processing logic at the multiple nodes before transferring a second set of data blocks pertaining to another job in the job store, where at least one of:
        the other job has a second quality-of-service parameter with a lower priority, and the quality-of-service parameter satisfies a requirement to receive an advanced position; and
waiting to begin to process the job until the completion threshold is reached, the completion threshold requiring that the multiple data blocks, comprising a complete set of data blocks to be processed during the job, be in cache for the available processing logic such that the job runs in real time without latencies associated with the transferring of the multiple data blocks to cache.

8. The non-transitory computer-readable medium of claim 1, further comprising instructions stored thereon executable by a processor to perform steps of:
transferring a complete set of data blocks for the job to cache for the available logic;
transferring a second complete set of data blocks for a second job to cache for additional available logic; and
beginning to process the job upon the completion threshold for the transferring of the first complete set of data blocks being reached before the completion threshold is reached for the second complete set of data blocks.

9. A method for processing data sets comprising:
reading characterization information from a job in a job store;
determining multiple data blocks to be processed during the job at multiple locations in a cluster of nodes from the characterization information;
comparing the multiple data blocks of the job to multiple sets of data blocks, each set of data blocks pertaining to a job;
selecting an overlap job with a degree of overlap between the multiple data blocks and a set of data blocks pertaining to the overlap job; and
scheduling the job and the overlap job for processing in close proximity to each other to take advantage of the degree of overlap to increase an opportunity for the multiple data blocks to progress to multiple instances of processing logic prior to processing.

10. The method of claim 9, further comprising:
provisioning the multiple data blocks to the multiple instances of processing logic during processing of a prior job by the cluster;
monitoring the multiple data blocks during provisioning; and
scheduling the job for processing once provisioning has satisfied a completion standard.

11. The method of claim 9, further comprising:
reading a quality-of-service parameter for the job within the characterization information; and
scheduling the job to be at least one of:
processed before another job because of an indication of higher priority in the quality-of-service parameter, and
processed after the other job because of an indication of lower priority in the quality-of-service parameter.

12. The method of claim 9, further comprising:
deriving a size of the job from the characterization information; and
placing the job in relation to another job with respect to a processing order such that the job is placed before the other job where the size is at least one of below a minimum threshold and smaller than a second size of the other job.

13. The method of claim 9, further comprising:
monitoring a set of data blocks to determine which data blocks are already in cache for processing logic residing at nodes in the cluster of nodes for processing;
selecting the job from multiple jobs in the job store, the job having a subset of data blocks of the multiple data blocks equal to at least a threshold amount of data blocks already in cache; and
processing the job to take advantage of the subset of data blocks already in cache.

14. The method of claim 9, further comprising:
determining locations for the multiple data blocks within a network;
estimating a time to provision the multiple data blocks from the locations to the multiple instances of processing logic;
scheduling the job relative to another job to allow for at least a portion of the time estimated to provision the multiple data blocks from the locations; and
begin provisioning the multiple data blocks to the multiple instances of provisioning logic.

15. A system for scheduling jobs for data processing comprising:
a plurality of computing nodes providing computing resources and configured to coordinate parallel processing, at least one of the computing nodes comprising a processor and a memory unit;
a job store operable to store a job that processes multiple data blocks in parallel within a cluster of nodes configured to coordinate parallel processing;
a job analyzer, executing on at least one processor, communicatively coupled to the job store and operable to read characterization information for the job in the job store and to identify, from the characterization information, multiple data blocks to be processed during the job;
a control manager, executing on at least one processor, communicatively coupled to the job analyzer and to the network and operable to warm up the cluster in anticipation of processing the job to which the multiple data blocks pertain by transferring the multiple data blocks from multiple storage locations to cache for available processing logic at multiple nodes in the cluster as the cluster processes a prior job; and
a scheduling module, executing on at least one processor, operable to:
schedule the job relative to at least one other job in the job store based on a priority for the job derived from the characterization information, and
schedule a processing time for the job after the transferring of the multiple data blocks achieves a predetermined benchmark.

16. The system of claim 15, further comprising a job evaluation module, executable on at least one processor, operable to:
estimate at least one of a processing time for the multiple data blocks of the job and a time to process a set of jobs scheduled to be processed before the job;
read a requested processing time in the characterization information provided by a client responsible for sending the job to the job store;
determine whether the job can be processed within the requested time; and
send a message to the client indicating a feasibility of processing the job with the requested time.

17. The system of claim 15, further comprising at least two of:
a quality-of-service module operable to read a quality-of-service parameter from the characterization information of the job and provide the quality-of-service parameter to a coordination module;

a deduction module operable to derive a job property from the characterization information and provide the job property to the coordination module;

a data-locating module operable to locate multiple storage locations of the multiple data blocks in a network including the cluster, assign an estimated provisioning time for the multiple data blocks, and provide the estimated provisioning time to the coordination module;

a status module operable to track provisioning-status information for a set of data blocks common to the multiple data blocks that is at least one of provisioned to a set of processing logic instances and in a process of being provisioned to the set of instances of processing logic and provide the provisioning-status information as input to the coordination module; and a data-overlap module operable to determine a degree of overlap between the multiple data blocks and a set of data blocks subject to a comparison job and provide the degree of overlap to the coordination module;

the system of claim 15, further comprising the coordination module communicatively coupled to the scheduling module and operable to determine a scheduling order for the job relative to at least one other job by prioritizing input about the job from at least two modules.

18. The system of claim 15, wherein the cluster of nodes is a virtual cluster with multiple virtual nodes implemented on physical resources.

* * * * *